United States Patent
Ahn et al.

(10) Patent No.: US 10,294,368 B2
(45) Date of Patent: May 21, 2019

(54) POLYARYLENE SULFIDE COMPOSITION HAVING EXCELLENT ADHESIVENESS WITH METAL

(71) Applicant: INITZ CO., LTD., Ulsan (KR)

(72) Inventors: Byung-Woo Ahn, Incheon (KR);
Jong-Wook Shin, Suwon-si (KR);
Hyeoung-Geun Oh, Suwon-si (KR);
Hae Ri Kim, Seongnam-si (KR)

(73) Assignee: INITZ CO., LTD., Ulsan (KR)

( * ) Notice: Subject to any disclaimer, the term of this patent is extended or adjusted under 35 U.S.C. 154(b) by 21 days.

(21) Appl. No.: 15/542,461

(22) PCT Filed: Jan. 28, 2016

(86) PCT No.: PCT/KR2016/000926
§ 371 (c)(1),
(2) Date: Jul. 10, 2017

(87) PCT Pub. No.: WO2016/129833
PCT Pub. Date: Aug. 18, 2016

(65) Prior Publication Data
US 2018/0273754 A1    Sep. 27, 2018

(30) Foreign Application Priority Data
Feb. 9, 2015 (KR) .................. 10-2015-0019748

(51) Int. Cl.
*C08L 81/02* (2006.01)
*C08L 63/00* (2006.01)
*C09J 181/02* (2006.01)

(52) U.S. Cl.
CPC .............. *C08L 81/02* (2013.01); *C08L 63/00* (2013.01); *C09J 181/02* (2013.01)

(58) Field of Classification Search
CPC .............................. C08L 81/02; C09J 181/02
USPC ...................................................... 524/200
See application file for complete search history.

(56) References Cited

U.S. PATENT DOCUMENTS

| | | | |
|---|---|---|---|
| 2,513,188 A | 6/1950 | Macallum | |
| 2,583,941 A | 1/1952 | Gordon, Jr. | |
| 6,037,422 A | 3/2000 | Yamao et al. | |
| 6,476,106 B1 * | 11/2002 | Murakami | C08K 5/5435 257/E23.12 |
| 2004/0266956 A1 | 12/2004 | Yamada et al. | |
| 2013/0035440 A1 * | 2/2013 | Nishikawa | C08L 77/12 524/602 |
| 2014/0194579 A1 | 7/2014 | Ramalingam et al. | |

FOREIGN PATENT DOCUMENTS

| | | |
|---|---|---|
| EP | 0424939 A2 | 5/1991 |
| EP | 1057871 A1 | 12/2000 |
| EP | 1491587 A2 | 12/2004 |
| JP | 2005060454 A * | 3/2005 |
| JP | 2009126883 A | 6/2009 |
| KR | 10-2001-0041196 A | 5/2001 |
| KR | 10-2005-0049129 A | 5/2005 |
| KR | 10-2008-0106435 A | 12/2008 |
| KR | 10-2011-0102226 A | 9/2011 |
| KR | 10-2014-0134646 A | 11/2014 |
| WO | 2009069725 A1 | 6/2009 |

OTHER PUBLICATIONS

Wu et al., Materials Chemistry and Physics, 128, 274-282, 2011. (Year: 2011).*
Translation of JP 2005-060454, Mar. 10, 2005. (Year: 2005).*
European Patent Office; Communication dated Jul. 3, 2018 in counterpart Application No. 16749373.3.
Defeng Wu, et al., "Effect of epoxy resin on the thermal behaviors and viscoelastic properties of poly(phenylene sulfide)", Mar. 7, 2011, pp. 274-282, vol. 128, No. 1, Materials Chemistry and Physics, Elsevier SA, Switzerland, Taiwan, Republic of China, XP028205717 (9 pages total).
Ji, Wei-Gang et al., "Improving the Corrosion Performance of Epoxy Coatings by Chemical Modification with Silane Monomers", Surface and Coatings Technology, 2007, pp. 4789-4795, vol. 201, No. 8.
International Searching Authority, International Search Report of PCT/KR2016/000926 dated May 3, 2016 [PCT/ISA/210].

* cited by examiner

*Primary Examiner* — Hui H Chin
(74) *Attorney, Agent, or Firm* — Sughrue Mion, PLLC

(57) ABSTRACT

The present invention relates to a polyarylene sulfide resin composition with a low outgas content, the composition containing: a polyarylene sulfide and a silane-modified epoxy resin. The polyarylene sulfide resin composition of the present invention shows excellent tensile strength and metal bonding strength as well as a low outgas content, and thus can be favorably used as a resin composition for manufacturing a product requiring molding accuracy.

10 Claims, 1 Drawing Sheet

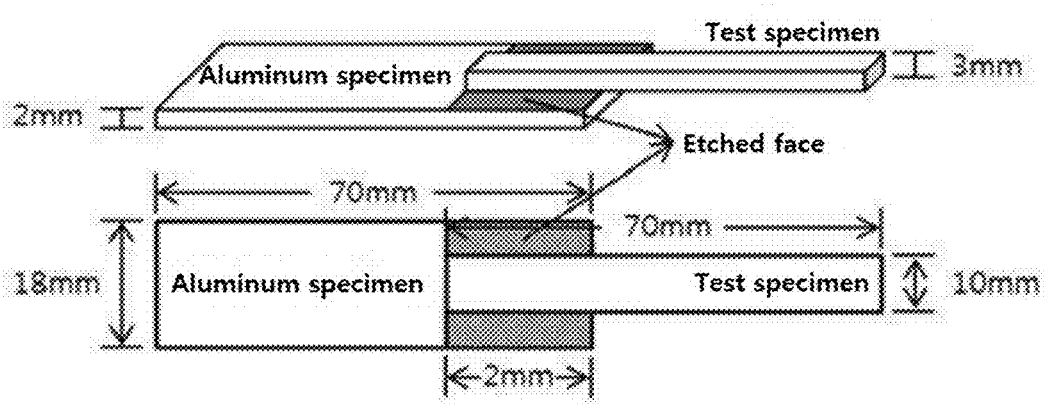

POLYARYLENE SULFIDE COMPOSITION HAVING EXCELLENT ADHESIVENESS WITH METAL

TECHNICAL FIELD

The present invention relates to a polyarylene sulfide composition having improved adhesion to metals with a small amount of outgassing.

BACKGROUND ART

Currently, a demand for a polyarylene sulfide, a representative engineering plastic, has increased for applications in a variety of electronic goods and products used in high temperatures and corrosive environments due to its high thermal resistance, chemical resistance, flame resistance, and electric insulation.

Polyphenylene sulfide (hereinafter, abbreviated to "PPS") is the only commercially available polyarylene sulfide. PPS is widely used for housing or major parts of automobile equipment and electric or electronic devices due to its excellent mechanical, electrical, and thermal properties, and chemical resistance.

The primary process for commercially producing PPS is solution polymerization of p-dichlorobenzene (hereinafter, abbreviated to "pDCB") and sodium sulfide in a polar organic solvent such as N-methyl pyrrolidone, which is known as the Macallum process.

When a polyarylene sulfide is produced by the Macallum process, however, the solution polymerization using sodium sulfide, etc., may produce by-products in a salt form, which requires washing or drying processes, etc., to remove such by-products in a salt form and any residual organic solvents. Further, a polyarylene sulfide produced by the Macallum process has a powder form, which may render the subsequent processes inconvenient and impair its workability (see U.S. Pat. Nos. 2,513,188 and 2,583,941).

To resolve the above problems, a process of manufacturing a polyarylene sulfide such as PPS by melt polymerization of reactants containing diiodide aromatic compounds and elemental sulfur has been suggested. As the process neither produces by-products in a salt form in the manufacture of polyarylene sulfide nor uses organic solvents, it does not require any separate process for removing such by-products or organic solvents. Further, the finally obtained polyarylene sulfide has a pellet form, which may render the subsequent processes convenient and improve its workability.

Meanwhile, conventional PPS has a problem of poor adhesion to metals since a large amount of outgassing (i.e., oligomers of low molecular weights) is generated at the flow front in injection molding, which prevents micropores on the metal surface from being filled when the PPS adheres to metals. As an alternative for improving adhesion of PPS to metals, a resin composition prepared by compounding PPS with a polyolefin containing a polar group and a compatibilizing agent has been suggested. However, it has been found that use of such alloy or oligomer degrades the mechanical properties of PPS and weakens the thermal characteristics of PPS.

Accordingly, it is required to develop a PPS composition having an excellent adhesive property to metals with a reduced amount of outgassing at the flow front, which is an underlying problem in the conventional metal adhesive plastics.

DISCLOSURE OF INVENTION

Technical Problem

An object of the present invention is to provide a polyarylene sulfide composition having an excellent adhesive property to metals with a small amount of outgassing at the flow front.

Solution to Problem

The present invention provides a resin composition comprising a polyarylene sulfide; and a silane-modified epoxy resin of Formula 1, wherein the amount of outgassing is 300 ppm or less:

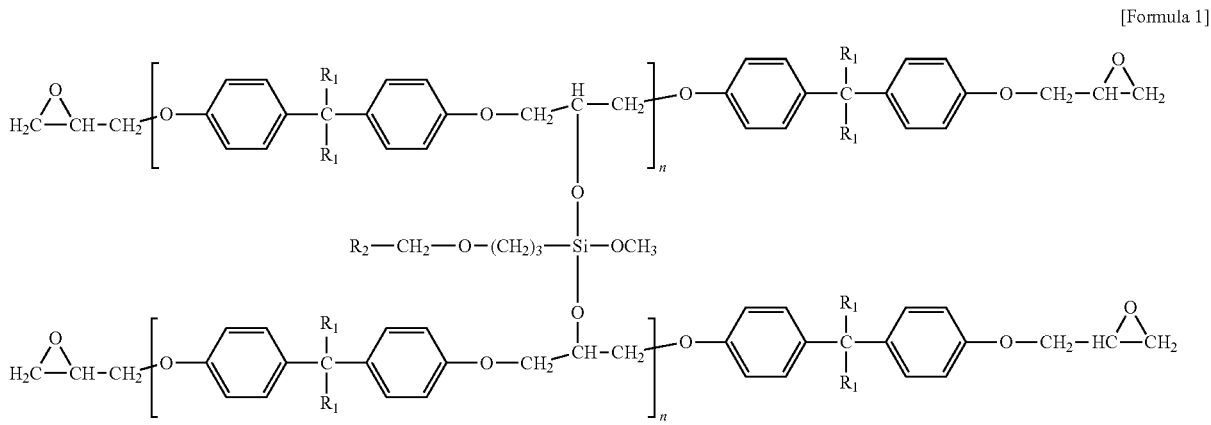

[Formula 1]

wherein
$R_1$ is hydrogen or $C_{1-6}$ alkyl;
$R_2$ is selected from the group consisting of epoxy, amino, mercapto, vinyl, and combinations thereof; and
n is an integer of 0 to 100.

Advantageous Effects of Invention

The polyarylene sulfide resin composition according to the present invention has an excellent adhesive property to metals, without compromising excellent mechanical and thermal properties unique to PPS, with a small amount of outgassing; therefore, it can be used in a variety of applications including electronic parts and automobile parts to be integrally formed by injection insert molding.

BRIEF DESCRIPTION OF DRAWINGS

FIG. 1 is a partial schematic diagram showing a process of preparing a specimen for testing adhesive strength to metals using the resin composition of the present invention.

BEST MODE FOR CARRYING OUT THE INVENTION

The present invention provides a resin composition comprising a polyarylene sulfide; and a silane-modified epoxy resin of Formula 1, wherein the amount of outgassing is 300 ppm or less:

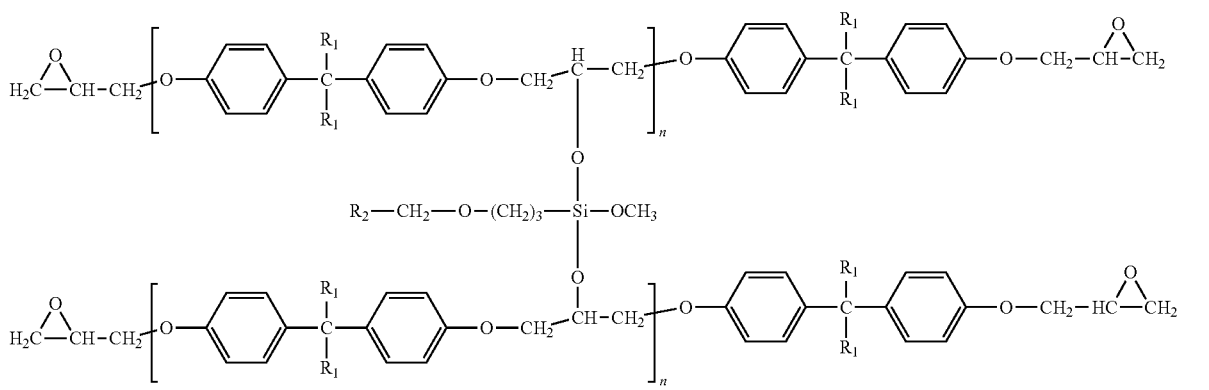

[Formula 1]

wherein $R_1$ is hydrogen or $C_{1-6}$ alkyl;

$R_2$ is selected from the group consisting of epoxy, amino, mercapto, vinyl, and combinations thereof; and n is an integer of 0 to 100.

The resin composition according to the present invention is characterized in that the amount of outgassing is 300 ppm or less, preferably from 150 to 300 ppm.

Hereinafter, the components of the present composition are described in detail.

The resin composition of the present invention comprises a polyarylene sulfide.

The polyarylene sulfide may be comprised in an amount of 20 to 85% by weight, preferably 30 to 80% by weight, based on the total amount of the composition. When the amount of the polyarylene sulfide is 20% by weight or higher, the mechanical strength such as tensile strength does not decrease. Further, when the amount is 85% by weight or lower, the adhesive effect to metals becomes excellent.

The polyarylene sulfide comprises an arylene sulfide repeating unit and an arylene disulfide repeating unit, and the weight ratio of arylene sulfide repeating unit to arylene disulfide repeating unit ranges from 1:0.0001 to 1:0.5.

The arylene sulfide repeating unit may be comprised in an amount of 95 to 99.99% by weight based on the total weight of polyarylene sulfide, and the arylene disulfide repeating unit may be comprised in an amount of 0.01 to 5% by weight based on the total weight of polyarylene sulfide.

The polyarylene sulfide may have a number average molecular weight of 3,000 to 1,000,000 and a polydispersity, defined as a ratio of weight average molecular weight to number average molecular weight, of 2.0 to 4.0, which indicates a relatively narrow dispersion.

The polyarylene sulfide may have a melting point ranging from 270 to 290° C., preferably from 275 to 285° C., for example about 280° C. Further, the melt viscosity as measured by a rotational disk-type viscometer at a temperature of melting point +20° C. may range from 100 to 5,000 poises, preferably from 500 to 3,000 poises, for example about 2,000 poises.

Since the polyarylene sulfide used in the present invention comprises a certain amount of an arylene disulfide repeating unit, it may have a lower melting point than that of a polyarylene sulfide having the same molecular weight but consisting of an arylene sulfide repeating unit only, which lowers the processing temperature and reduces the amount of outgassing generated as by-products in the molding process. Further, the polyarylene sulfide finally produced has excellent physical properties.

The polyarylene sulfide is not specifically limited as long as it satisfies the properties discussed above. For instance, the polyarylene sulfide may be produced by solution polymerization. Further, the polyarylene sulfide that satisfies the properties discussed above improves adhesion of a resin composition to metals.

Specifically, the polyarylene sulfide may be produced by the method disclosed in Korea Patent Laid-open Publication No. 2011-0102226, which may comprise the steps of, for example, (a) carrying out a polymerization reaction of reactants comprising a diiodide aromatic compound and a sulfur compound; and (b) during the polymerization reaction, further adding a sulfur compound in an amount of 0.1 to 20 parts by weight based on 100 parts by weight of the sulfur compound contained in the reactants.

Since a small amount of a sulfur compound is further added during the polymerization reaction in the above-mentioned method, disulfide-type bonds may be formed in the polymer. The disulfide-type bonds continuously participate in a sulfur exchange reaction, a type of equilibrium reaction, with the polymer chains contained in the polyarylene sulfide, thereby rendering uniform the molecular weights of the polymer chains contained in the polyarylene sulfide. Especially, the degree of polymerization of the reactants may be generally uniform due to the equilibrium reaction of sulfur exchange reaction; therefore, the formation of polyarylene sulfide polymer chains having excessively large or small molecular weights may be suppressed.

The reactants comprising a diiodide aromatic compound and a sulfur compound may be melt blended before the polymerization step. The diiodide aromatic compound may be used in an amount of 1,000 to 1,400 parts by weight based on 100 parts by weight of the sulfur compound supplied before the polymerization.

In the step of polymerization reaction, 1 to 20 parts by weight of a polymerization terminator may be added based on 100 parts by weight of the sulfur compound supplied to the reactants. The polymerization terminator is not specifically limited as long as it can terminate the polymerization by removing the iodine groups contained in the polymer to be prepared. As the polymerization terminator, at least one selected from the group consisting of diphenyl sulfide, diphenyl ether, biphenyl (or diphenyl) benzophenone, dibenzothiazyl disulfide, monoiodoaryl compounds, benzothiazoles, benzothiazole sulfenamides, thiurams, dithiocarbamates, and diphenyl disulfide may be used.

The diiodide aromatic compounds, which may be used in the polymerization reaction of a polyarylene sulfide, are at least one selected from the group consisting of diiodobenzene (DIB), diiodonaphthalene, diiodobiphenyl, diiodobisphenol, and diiodobenzophenone, but are not limited thereto.

The conditions for the polymerization reaction are not specifically limited as long as the reaction of the diiodide aromatic compounds with the sulfur compounds may be initiated. Preferably, the polymerization may be performed in reaction conditions of elevated temperatures and reduced pressures. Specifically, the temperature is elevated and the pressure is reduced from an initial reaction condition of a temperature of 180 to 250° C. and a pressure of 50 to 450 torr to a final reaction condition of a temperature of 270 to 350° C. and a pressure of 0.001 to 20 torr. The reaction may be performed for 1 to 30 hours.

Meanwhile, the resin composition of the present invention comprises a silane-modified epoxy resin.

The silane-modified epoxy resin may comprise bisphenol, preferably bisphenol A or bisphenol F, etc., and may be represented, for example, by the following formula 1.

The silane-modified epoxy resin may be comprised in an amount of 0.5 to 10% by weight, preferably 1 to 8% by weight, based on the total amount of the composition. When the amount of the silane-modified epoxy resin is 0.5% by weight or higher, the adhesive strength to metals becomes excellent. Further, when the amount is 10% by weight or lower, the mechanical strength is not impaired.

According to the present invention, the addition of the silane-modified epoxy resin may impart an excellent adhesive property to metals to the resin composition that the conventional PPS resin composition could not have.

The resin composition of the present invention may further comprise a component selected from the group consisting of an elastomer, a filler, a shock absorber, an adhesiveness enhancer, a stabilizer, a pigment, and combinations thereof.

As the elastomer, a thermoplastic elastomer selected from the group consisting of polyvinyl chloride elastomers, polyolefin elastomers, polyurethane elastomers, polyester elastomers, polyamide elastomers, polybuthadiene elastomers, a terpolymer of glycydil methacrylate and methyl acryl ester, and combinations thereof may be used. A preferable elastomer is a terpolymer of glycidyl methacrylate and methyl acryl ester.

The elastomer may be comprised in an amount of 1 to 15% by weight, preferably 3 to 10% by weight, based on the total amount of the resin composition. The addition of the elastomer to the resin composition of the present invention may impart toughness to PPS, which prevents interfacial separation between the resin and the metal that may otherwise be caused by changes in temperature after adhesion to the metal.

As the filler, at least one organic or inorganic filler selected from the group consisting of a glass fiber, a carbon fiber, a boron fiber, a glass bead, a glass flake, talc, and calcium carbonate may be used. A preferable filler is a glass fiber. The filler may be in the form of powder or flake, but is not limited thereto.

The glass fiber used as the filler may be selected from the group consisting of a urethane/epoxy silane-treated glass

[Formula 1]

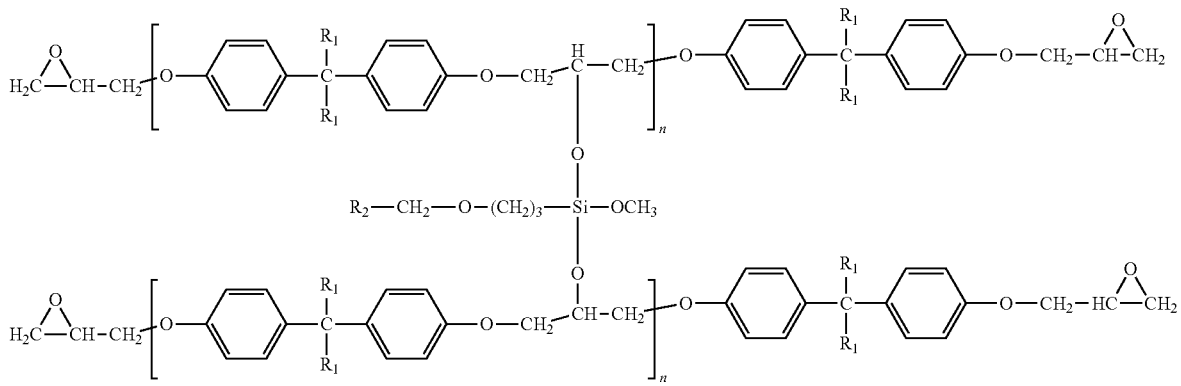

wherein $R_1$ is hydrogen or $C_{1-6}$ alkyl;

$R_2$ is selected from the group consisting of epoxy, amino, mercapto, vinyl, and combinations thereof; and n is an integer of 0 to 100.

Preferably, $R_1$ is hydrogen or methyl; $R_2$ is epoxy or amino; and n is an integer of 1 to 100.

fiber, a urethane/amino silane-treated glass fiber, and combinations thereof. A preferable glass fiber may be a urethane/epoxy silane-treated glass fiber or a urethane/amino silane-treated glass fiber.

The filler may be comprised in an amount of 5 to 50% by weight, preferably 10 to 40% by weight, based on the total amount of the resin composition.

As the pigment, conventional organic or inorganic pigments known in the art, for example, an organic or inorganic pigment selected from the group consisting of titanium dioxide ($TiO_2$), carbon black, and combinations thereof may be used. Preferably, titanium dioxide may be used.

The pigment may be comprised in an amount of 0.1 to 10% by weight, preferably 0.3 to 7% by weight, based on the total amount of the composition.

The resin composition according to the present invention may further comprise, in addition to the above components, a variety of conventional additives known in the art, such as an antioxidant, a photostabilizer, a UV stabilizer, a plasticizer, a nucleating agent, and the like.

An example of the antioxidant may be phenolic antioxidants, amine antioxidants, sulfur antioxidants, and phosphorus antioxidants. Antioxidants serve to sustain high heat resistance and thermal stability of the resin composition according to the present invention.

As the phenolic antioxidants, hindered phenol compounds are preferably used. Specific examples are tetrakis[methylene-3-(3,5-di-tert-butyl-4-hydroxyphenyl)propionate]methane, thiodithylene bis[3-(3,5-di-tert-butyl-4-hydroxyphenyl) propionate], N,N'-hexane-1,6-diylbis[3-(3,5-di-tert-butyl-4-hydroxyphenylpropionamide], and so on.

Examples of the phosphorus antioxidants are tris(2,4-di-tert-butylphenyl)phosphate, O,O'-dioctadecylpentaerythritol bis(phoshite), bis(2,4-di-tert-butylphenyl)pentaerythritol diphosphite, 3,9-bis(2,4-di-tert-butylphenoxy)-2,4,8,10-tetraoxy-3,9-diphospaspiro[5.5]undecane, and so on.

Further, the resin composition according to the present invention may comprise various lubricants for enhancing moldability. Especially, hydrocarbon lubricants may be used to prevent friction between the resin and the mold metal and to confer releasability from the mold, etc.

The resin composition of the present invention may have a tensile strength of 50 to 150 MPa, preferably 70 to 150 MPa, as measured according to ASTM D 638 and an adhesive strength to metals of 25 MPa or higher, preferably 30 MPa or higher, more preferably 30 to 70 MPa, as measured by the test method of ASTM D 3163 for a metal adhesive test specimen obtained by insert injection on to an aluminum plate etched in a certain pattern.

Thus, as the resin composition of the present invention comprises the polyarylene sulfide and the silane-modified epoxy resin discussed above, it may have an excellent adhesive property to metals, without compromising excellent mechanical and thermal properties unique to PPS, with a small amount of outgassing.

Further, the present invention provides molded articles manufactured from the present resin composition.

The resin composition of the present invention may be used according to known methods in the art, such as biaxial extrusion, to manufacture molded articles, which have excellent impact resistance and may be used in a variety of applications.

The molded articles may be in various forms including films, sheets, or fibers according to the present invention. The molded articles may be injection molded articles, extrusion molded articles, or blow molded articles. In case of injection molding, the temperature of the mold may be about 130° C. or higher in light of crystallization.

In case that the molded articles are in film or sheet forms, they may be manufactured as various films or sheets such as non-oriented, uniaxially oriented, or biaxially oriented films or sheets. The molded articles may be used as a non-oriented fiber, a drawn fiber, or an ultra-drawn fiber, etc., and also used as a fabric, knitted goods, a non-woven fabric (spunbond, meltblow, or staple), a rope, or a net.

The above molded articles may be used as electric/electronic parts, building materials, automobile parts, machine parts, or basic commodities, as well as coatings of an area contacted with chemicals or an industrial fiber with chemical resistance.

MODE FOR THE INVENTION

Hereinafter, the present invention is explained in detail by Examples. The following Examples are intended to further illustrate the present invention without limiting its scope.

Preparation Example 1: Preparation of PPS 40 kg of p-diiodobenzene, 3.4 kg of sulfur, and 150 g of 1,3-diiodo-4-nitrobenzene as a catalyst were melt blended at 180° C. in a reactor. The mixed reactants were subjected to a polymerization reaction while the temperature was raised from 180° C. to 340° C. and the pressure was reduced from 350 torr to 10 torr. At the time of 5 hours after the initiation of polymerization, 150 g of sulfur and 100 g of diphenyl sulfide as a polymerization terminator were added to the reaction mixture, and the polymerization reaction was performed for additional 3 hours to obtain a polymer.

Melt viscosity (MV), melting point (Tm), and weight ratio of the repeating units of the resulting PPS polymer were measured according to the following methods. As a result, the PPS polymer had an MV of 2,000 poise, a Tm of 280° C., a number average molecular weight of 16,400, and a weight ratio of arylene sulfide unit to arylene disulfide unit of 1:0.003.

Melt Viscosity

Melt viscosity was measured at Tm+20° C. by a rotating disk viscometer. In the frequency sweep method, the angular frequency was measured from 0.6 to 500 rad/s, and the viscosity at 1.0 rad/s was defined as melt viscosity.

Melting Point

Using a differential scanning calorimeter, the melting point was measured while the temperature was raised from 30 to 320° C. at a speed of 10° C./minute, cooled to 30° C., and then raised from 30° C. to 320° C. at a speed of 10° C./minute.

Weight Analysis of Repeating Units 2 mg of the produced PPS polymer were combusted at 1,000° C. in an Automatic Quick Furnace. Sulfur gas was entrapped in an absorbing solution (e.g., hydrogen peroxide) and ionized. The sulfur ions were separated in a column of ion chromatography, and their amounts were measured by a standard material ($K_2SO_4$) for sulfur. The difference between the measured sulfur amount and the theoretical sulfur amount was calculated as the amount of arylene disulfide.

Example 1: Preparation of PPS Resin Compositions

67% by weight of the PPS resin obtained in Preparation Example 1, 15% by weight of a glass fiber treated with an urethane/epoxy silane (OCV-910, Owens Corning), 8% by weight of an elastomer (Lotader AX-8900, Arkema), 5% by weight of a silane-modified epoxy resin (KSR-900, Kukdo Chemical Co., Ltd.), and 5% by weight of a white pigment $TiO_2$ (2233 grade, Kronoss) were fed to a biaxial screw extruder to prepare a composition.

The extruder had a diameter of 40 mm and an L/D of 44 (SM Platek). The extrusion conditions were a screw speed of 250 rpm, a feed rate of 60 kg/hour, a barrel temperature of 280 to 300° C., and a torque of 60%. The above materials were fed through a total of three feeders, in which the first feeder was used to feed the PPS resin, elastomer, and silane-modified epoxy resin; the second feeder to feed the white pigment; and the third feeder to feed the glass fiber.

Examples 2 to 6

The same procedures as in Example 1 were repeated to prepare PPS resin compositions, except that the components and their amounts were as described in table 2 below.

Comparative Example 1

The same procedures as in Example 1 were repeated to prepare a PPS resin composition, except that a BPA-type epoxy resin (YD-017, Kukdo Chemical Co., Ltd.) was used instead of the silane-modified epoxy resin.

Comparative Example 2

The same procedures as in Example 1 were repeated to prepare a PPS resin composition, except that the components and their amounts were as described in table 2 below.

Comparative Example 3

The same procedures as in Example 1 were repeated to prepare a PPS resin composition, except that the components and their amounts were as described in table 2 below and no epoxy resin was used.

Comparative Example 4

The same procedures as in Example 1 were repeated to prepare a PPS resin composition, except that PPS1 (0205P4, Ticona, a linear type PPS) prepared by a solution polymerization method instead of that obtained in Preparation Example 1 was used.

Comparative Example 5

The same procedures as in Example 1 were repeated to prepare a PPS resin composition, except that the components and their amounts were as described in table 2 below, PPS1 (0205P4, Ticona, a linear type PPS) prepared by a solution polymerization method instead of that obtained in Preparation Example 1 was used, and no epoxy resin was used.

Comparative Example 6

The same procedures as in Example 1 were repeated to prepare a PPS resin composition, except that PPS2 (P6, Chevron Philips, a cross-over type PPS) prepared by a solution polymerization method instead of that obtained in Preparation Example 1 was used.

Table 1 below shows the manufacturers of the components used in Examples 1 to 6 and Comparative Examples 1 to 6.

TABLE 1

| | Components | Grades | Manufacturers |
|---|---|---|---|
| A | PPS obtained in Preparation Example 1 | — | — |
| B | PPS1 prepared by solution polymerization | 0205P4 | Ticona |
| C | PPS2 prepared by solution polymerization | P6 | Chevron Philips (CPC) |
| D | Silane-modified epoxy | KSR-900 | Kukdo Chemical Co., Ltd. |
| E | BPA epoxy | YD-017 | Kukdo Chemical Co., Ltd. |
| F-1 | Urethane/epoxy silane-treated glass fiber | TF-523 | Owens corning |
| F-2 | Urethane/amino silane-treated glass fiber | OCV-910 | Owens corning |
| G | White pigment ($TiO_2$) | 2233 | Kronoss |
| H | Elastomer | Lotader AX-8900 | Arkema |

TEST EXAMPLES

Physical properties of the PPS resin compositions prepared in Examples and Comparative Examples were tested as described below. The results are shown in Table 2.

First, the PPS resin compositions prepared in Examples and Comparative Examples were injected at 310° C. to prepare injection molded specimens.

(1) Amount of Outgassing 2 g of the injection molded specimen were placed in 20 mL sealed vial. After the vial was heated at 260° C. for 30 minutes in a Head Space equipment, the generated gas was automatically transported to a gas chromatography-mass spectrometer. Then, each component was separated with a capillary column for qualitative analysis, and the amount of each component in the specimen was quantitatively analyzed with benzothiazole as a standard material.

(2) Tensile Strength

Tensile strength of the injection molded specimen was measured according to ASTM D 638 method.

(3) Adhesive Strength to Metals

An aluminum specimen (length: 70 mm, width: 18 mm, and height: 2 mm) specifically etched was placed between a fixed mold and a mobile mold in a 2-plate injection molding machine. The PPS resin compositions prepared in Examples and Comparative Examples were each injection molded between the 2-plate mold at an injection speed of 40 mm/s and a pressure of 70 bars. The molded parts were released from the mold to prepare test specimens (length: 70 mm, width: 18 mm, and height: 2 mm) for measuring adhesive strength to metals (see FIG. 1). The adhesive strength to metals of the test specimens was measured according to ASTM D 3163 method.

TABLE 2

| Components (% by weight) | | Examples | | | | | | Comparative Examples | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| PPS | A | 67 | 62 | 52 | 42 | 59 | 59 | 67 | 60 | 72 | — | — | — |
| | B | — | — | — | — | — | — | — | — | — | 67 | 72 | — |
| | C | — | — | — | — | — | — | — | — | — | — | — | 67 |
| Epoxy resin | D | 5 | 5 | 5 | 5 | 8 | 8 | — | 12 | — | 5 | — | 5 |
| | E | — | — | — | — | — | — | 5 | — | — | — | — | — |
| | F-1 | 15 | 20 | 30 | 40 | 20 | — | 15 | 15 | 15 | 15 | 15 | 15 |
| | F-2 | — | — | — | — | — | 20 | — | — | — | — | — | — |
| | G | 5 | 5 | 5 | 5 | 5 | 5 | 5 | 5 | 5 | 5 | 5 | 5 |
| | H | 8 | 8 | 8 | 8 | 8 | 8 | 8 | 8 | 8 | 8 | 8 | 8 |
| Physical Property | Amount of outgassing (ppm) | 297 | 272 | 242 | 183 | 257 | 259 | 292 | 280 | 310 | 635 | 670 | 1340 |
| | Tensile strength (MPa) | 90 | 105 | 122 | 140 | 87 | 84 | 88 | 65 | 105 | 95 | 110 | 88 |
| | Adhesive strength to metals (MPa) | 60 | 61 | 54 | 47 | 63 | 62 | 28 | 68 | 10 | 26 | 9 | 15 |

As shown in Table 2, the resin compositions according to the present invention produce an effect of reducing the amount of outgassing by 3 to 5 times compared with those of Comparative Examples 4 to 6 containing PPS1 or PPS2 produced by solution polymerization. Further, the present resin compositions containing a silane-modified epoxy resin have adhesive strengths to metals of 47 to 63 MPa, which are greatly improved compared with that of Comparative Example 1 containing a BPA epoxy resin. It is also noted that the composition of Comparative Example 2 containing an excessive amount of a silane-modified epoxy has decreased tensile strength, while that of Comparative Example 3 containing no silane-modified epoxy has greatly decreased tensile strength.

Consequently, the resin composition according to the present invention may have excellent adhesiveness to metals, with a reduced amount of outgassing. Therefore, it may be used in many different fields from electronic parts to automobile parts to be integrally formed by injection insert molding.

The invention claimed is:

1. A resin composition comprising a polyarylene sulfide; and a silane-modified epoxy resin of Formula 1, wherein the amount of outgassing is 300 ppm or less:

Formula 1

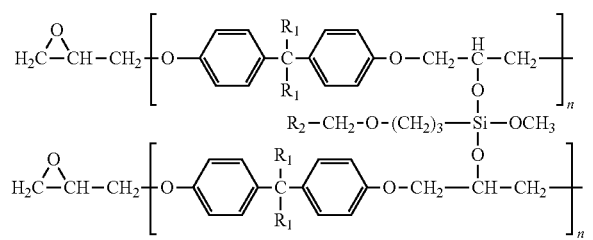

-continued

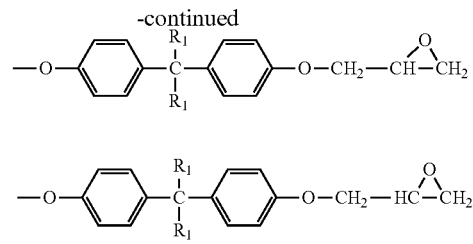

wherein
$R_1$ is hydrogen or $C_{1-6}$ alkyl;
$R_2$ is selected from the group consisting of epoxy, amino, mercapto, vinyl, and combinations thereof; and
n is an integer of 1 to 100.

2. The composition of claim 1, wherein the silane-modified epoxy resin is comprised in an amount of 0.5 to 10% by weight based on the total amount of the composition.

3. The composition of claim 1, further comprising a component selected from the group consisting of an elastomer, a filler, a shock absorber, an adhesiveness enhancer, a stabilizer, a pigment, and combinations thereof.

4. The composition of claim 3, wherein the elastomer is a thermoplastic elastomer selected from the group consisting of polyvinyl chloride elastomers, polyolefin elastomers, polyurethane elastomers, polyester elastomers, polyamide elastomers, polybutadiene elastomers, a terpolymer of glycidyl methacrylate and methyl acryl ester, and combinations thereof.

5. The composition of claim 3, wherein the filler is at least one organic or inorganic filler selected from the group consisting of a glass fiber, a carbon fiber, a boron fiber, a glass bead, a glass flake, talc, and calcium carbonate.

6. The composition of claim 5, wherein the glass fiber is selected from the group consisting of a urethane/epoxy silane treated glass fiber, a urethane/amino silane treated glass fiber, and combinations thereof.

7. The composition of claim 3, wherein the pigment is an organic or inorganic pigment selected from the group consisting of titanium dioxide ($TiO_2$), carbon black, and combinations thereof.

8. The composition of claim 3, wherein the pigment is comprised in an amount of 0.1 to 10% by weight based on the total amount of the composition.

9. The composition of claim 1, wherein the composition has a tensile strength of 50 to 150 MPa as measured according to ASTM D 638.

10. The composition of claim 1, wherein the composition has an adhesive strength to metals of 25 MPa or higher as measured according to ASTM D 3163.

\* \* \* \* \*